United States Patent
Tannas, Jr.

(10) Patent No.: US 8,885,138 B2
(45) Date of Patent: Nov. 11, 2014

(54) APPARATUS AND METHODS FOR RESIZING ELECTRONIC DISPLAYS

(71) Applicant: Lawrence E. Tannas, Jr., Orange, CA (US)

(72) Inventor: Lawrence E. Tannas, Jr., Orange, CA (US)

(*) Notice: Subject to any disclaimer, the term of this patent is extended or adjusted under 35 U.S.C. 154(b) by 0 days.

(21) Appl. No.: 13/856,435

(22) Filed: Apr. 3, 2013

(65) Prior Publication Data

US 2013/0265738 A1 Oct. 10, 2013

Related U.S. Application Data

(60) Provisional application No. 61/619,428, filed on Apr. 3, 2012.

(51) Int. Cl.
*G02F 1/1333* (2006.01)
*H01J 9/26* (2006.01)
*H01J 9/50* (2006.01)
*G02F 1/1339* (2006.01)

(52) U.S. Cl.
CPC ............... *H01J 9/261* (2013.01); *G02F 1/1339* (2013.01); *G02F 1/133351* (2013.01); *H01J 9/50* (2013.01)
USPC ............................ 349/187; 349/190; 445/25

(58) Field of Classification Search
CPC ........... H01J 9/261; H01J 9/50; G02F 1/1339; G02F 1/133351
USPC ................ 349/54, 55, 187, 192, 190; 445/25; 361/809
See application file for complete search history.

(56) References Cited

U.S. PATENT DOCUMENTS

| | | | |
|---|---|---|---|
| 4,275,494 | A | 6/1981 | Kohyama et al. |
| 4,743,099 | A | 5/1988 | Dickerson et al. |
| 5,164,565 | A | 11/1992 | Addiego et al. |

(Continued)

FOREIGN PATENT DOCUMENTS

| | | |
|---|---|---|
| EP | 0556855 | 8/1993 |
| JP | 55026516 | 8/1978 |

(Continued)

OTHER PUBLICATIONS

PCT International Search Report and Written Opinion for PCT/US2013/035184, Applicant: Lawrence E. Tannas, Jr., Forms PCT/ISA/210, PCT/ISA/220 and PCT/ISA/237, dated Aug. 12, 2013, 13 pages.

*Primary Examiner* — Dung Nguyen
*Assistant Examiner* — Tai Duong
(74) *Attorney, Agent, or Firm* — William A. English; Vista IP Law Group LLP

(57) ABSTRACT

Apparatus and methods are provided for resizing an electronic display that includes front and back plates, a perimeter seal spacing apart the plates and defining an enclosed cell area between the plates that includes an original display image area, image-generating medium sealed in the enclosed cell area, and electrical circuits on inner surfaces of the plates extending throughout the original display image area. For example, a cut line may be identified that intersects across the original display image area of the display. A laser may be directed adjacent the cut line to heat and/or separate leads of the electrical circuits adjacent the cut line. The display may be cut adjacent the cut line, e.g., before or after separating leads along the cut line, resulting in a target display portion with an exposed edge, and an excess display portion, and then the exposed edge may be sealed.

20 Claims, 4 Drawing Sheets

(56) References Cited

U.S. PATENT DOCUMENTS

| | | |
|---|---|---|
| 5,169,693 A | 12/1992 | Fujimura |
| 5,278,685 A | 1/1994 | Iwamoto et al. |
| 5,610,742 A | 3/1997 | Hinata et al. |
| 5,757,456 A | 5/1998 | Yamazaki et al. |
| 5,781,258 A | 7/1998 | Dabral et al. |
| 5,808,719 A | 9/1998 | Fujiwara et al. |
| 5,812,226 A | 9/1998 | Izumi et al. |
| 5,851,411 A | 12/1998 | An et al. |
| 5,929,961 A | 7/1999 | Nishi et al. |
| 6,099,672 A | 8/2000 | Yamazaki et al. |
| 6,137,559 A | 10/2000 | Tanaka et al. |
| 6,191,840 B1 | 2/2001 | Bon |
| 6,204,906 B1 | 3/2001 | Tannas |
| 6,236,446 B1 | 5/2001 | Izumi et al. |
| 6,476,415 B1 | 11/2002 | Walker et al. |
| 6,509,949 B1 | 1/2003 | Lu et al. |
| 7,161,651 B2 * | 1/2007 | Smovzh ............ 349/187 |
| 7,256,862 B2 | 8/2007 | Chen et al. |
| 7,595,857 B2 | 9/2009 | Yang et al. |
| 7,780,492 B2 | 8/2010 | Tannas |
| 7,938,051 B2 | 5/2011 | Tannas |
| 2002/0018175 A1 | 2/2002 | Hong et al. |
| 2002/0033926 A1 | 3/2002 | Nakahara et al. |
| 2002/0044253 A1 | 4/2002 | Masuda et al. |
| 2003/0184706 A1 | 10/2003 | Watson |
| 2004/0074366 A1 | 4/2004 | Choo et al. |
| 2005/0001974 A1 | 1/2005 | Iida et al. |
| 2005/0056127 A1 | 3/2005 | Yamabuchi et al. |
| 2010/0195039 A1 * | 8/2010 | Park ............ 349/152 |

FOREIGN PATENT DOCUMENTS

| | | |
|---|---|---|
| JP | 55084918 | 6/1980 |
| JP | 5-045617 | 2/1993 |
| JP | 6-130403 | 5/1994 |
| KR | 20070054438 A | 5/2007 |

* cited by examiner

APPARATUS AND METHODS FOR RESIZING ELECTRONIC DISPLAYS

RELATED APPLICATION DATA

The present application claims benefit of provisional application Ser. No. 61/619,428, filed Apr. 3, 2012, the entire disclosure of which is expressly incorporated by reference herein.

FIELD OF THE INVENTION

The present invention relates to the field of resizing Liquid Crystal Displays ("LCDs") and other Flat Panel Displays ("FPDs") or electronic displays, and more particularly to methods for resizing electronic displays that prevent or reduce electrical shorts that may otherwise occur because of the resizing process.

BACKGROUND

It has been demonstrated that electronic displays may be resized to new dimensions. The display may be cut by mechanical scribing and breaking, sawing, laser scribing, water jet, or other known techniques. The retained portion of the cut display may be resealed, e.g., by applying a sealant along the exposed and newly-cut edge. The sealant may be applied along the cut edge in a way sufficient to seal the image-generating medium in between the plates, to structurally bond the plates together while preserving the dimensional characteristics required of the electronic display, and/or to obtain structural strength. Additionally, the sealant should maintain the cell structure with sufficient bonding strength to survive the environment to which the display will be exposed. For example, it has been proposed to apply a bead of sealant along the cut edge and cure the sealant in place. To enhance the strength, the sealant may be distributed into and between the plates, e.g., as disclosed in U.S. Pat. Nos. 6,204,906 and 7,780,492, the entire disclosures of which are expressly incorporated by reference herein.

During the process of resizing an active matrix liquid crystal display ("AMLCD"), e.g., when scribing and breaking or otherwise cutting a display to create a target portion, row and/or column lines of the display may be torn, e.g., at the cut edge, and thereby caused to connect to the ground plane or otherwise contact other circuit elements. Other electrodes such as ground lines, capacitor plates, transistor gates, and the like, included in the circuits of an AMLCD may also cause an electrical short along the cut edge. Such a "short" may result in the visual appearance of a line or partial line extending across the image, the line beginning at the cut edge. Such an effect is referred to herein as a "line out."

A resulting line out may be cured by observing its location and disturbing the source area of the short along the cut edge until the line out disappears from the image. For example, the disturbance may mitigated by a mechanical force (e.g., grinding at the cut edge location of the line out), chemically etching the area with acid, electrically causing overpowering of the circuit, laser cutting, and the like. Exemplary methods for resizing displays and/or repairing resized displays experiencing such shorts are disclosed in U.S. Publication No. 2011/0281489 and International Publication No. WO 2011/146173, the disclosures of which are expressly incorporated by reference herein.

Therefore, apparatus and methods for resizing electronic displays in a manner that reduces lines-out and/or other shorts would be useful.

SUMMARY

The present application is directed to apparatus and methods for resizing liquid crystal displays (LCDs) or other electronic displays, and, more particularly, to methods for resizing electronic displays that prevent or reduce electrical shorts that may otherwise occur because of the resizing process.

An electronic display generally includes two plates, front and back, holding drive electronics on the edges and throughout the area of the display image. The plates are typically glass or plastic and may have polarizers, filters, image enhancement films, and/or viewing angle enhancement films attached thereto. Picture element electrodes are distributed throughout the display image area, e.g., on inner surfaces of the plates, to control the image-generating medium. A perimeter seal holds the plates together while isolating and protecting the image-generating medium from the outside environment and/or maintaining mechanical alignment.

If desired, a display may be cut through the original seal, electronics, and image-generating medium in order to create a new and smaller resized target display portion and an excess or waste portion. For example, a display may be cut, e.g., through the original display area (including picture elements and associated electronics) to generate a target portion to be preserved and resealed as well as a waste or excess portion (both of which will include some of the original picture elements and associated electronics). The seal integrity should be reestablished on the target portion to provide a usable resized display. To reestablish the seal, an adhesive or other sealant may be applied, e.g., forced, injected, or otherwise applied between the plates and/or along the exposed edge, as disclosed in the references incorporated by reference elsewhere herein.

In accordance with an exemplary embodiment, a method is provided for resizing an electronic display that includes front and back plates, a perimeter seal spacing apart the plates and at least partially defining an enclosed cell area between the plates that includes an original display image area, image-generating medium sealed in the enclosed cell area, and electrical circuits on inner surfaces of the plates extending throughout the original display image area. The method may include identifying a cut line that intersects across the original display image area of the display; heating, burning, melting, and/or otherwise severing leads and/or other electrical circuits adjacent the cut line; cutting the display adjacent the cut line resulting in a target display portion with an exposed edge, and an excess display portion; and sealing the exposed edge.

For example, a circuit line may be cut along the cut line to render the circuit line effectively open, e.g., by focusing or otherwise directing a laser on the circuit area adjacent the cut line. A laser may be used to cut the circuits ahead of any shorts that may otherwise be induced by the cutting process, i.e., by cutting the leads that lead to the short. Any short along the cut edge is thus removed from the active circuits and no longer risks causing a line out. The most direct approach of laser repair is to cut a row or column line near the cut edge between the short area and display image area. The short may be isolated before, during, or after the display is resized. Cutting out the short before the display is resized and before the short actually exists may be performed using a laser Model M-1 manufactured by LASEROD. To be successful in cutting the row and column lines before the display is resized involves cutting all of the lines along a cut edge. This is a global approach to any potential short that may otherwise occur along the cut edge. If successful, then none of the pixels will function in the portion to be made "waste" during the resizing process.

In an exemplary embodiment, the laser may be installed on the glass-cutting equipment, which may be articulated similar to equipment used for glass cutting and/or polarizer cutting, such as those disclosed in U.S. Pat. No. 7,938,051, the entire disclosure of which is expressly incorporated by reference herein. Shorts that may otherwise be induced by the glass-cutting process may be assured not to affect image generation of the target portion of the display. Thus, the glass cutting operation may proceed without concern for the ramifications of shorts being induced by the glass-cutting operating. Further, the laser cutting may be done in the immediate proximity of the resized cut line used to separate the waste portion from the target portion of the resized display, e.g., offset a predetermined distance from the cut line towards the target portion. This has a further advantage of reducing the risk of latent damage to the circuit(s) occurring later during the product life of the resized display.

It is anticipated that the best path for the laser cut may be across the row or column leads, avoiding any active elements or capacitors that may exist. It is further anticipated that operating the display with a test pattern image may cause current to flow in the row or column leads to fuse open any high resistance connections left from the burning action of the laser. It is further anticipated that the process may benefit from heating or cooling the LCD during the laser cutting operation.

In accordance with another embodiment, an electronic display is provided that includes front and back plates; a perimeter seal spacing apart the plates and at least partially defining an enclosed cell area between the plates that comprises an active display image area; image-generating medium sealed in the enclosed cell area; and electrical circuits on inner surfaces of the plates extending throughout the active display image area. A first edge of at least one of the plates includes external driver circuits coupled to the electrical circuits, and a second edge opposite the first edge includes electrical circuits that are electrically isolated from the electrical circuits.

In accordance with still another embodiment, an electronic display is provided that includes front and back plates including a first edge comprising driver circuits and a second edge opposite the first edge that has been cut and resealed; a perimeter seal spacing apart the plates and at least partially defining an enclosed cell area between the plates that comprises an active display image area; image-generating medium sealed in the enclosed cell area; and electrical circuits on inner surfaces of the plates extending throughout the active display image area. The electrical circuits may include leads coupled to the driver circuits and extending through the active display image area to the second edge, wherein the leads are severed along a line extending along the second edge.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which.

DETAILED DESCRIPTION OF THE EXEMPLARY EMBODIMENTS

Figure 1A:
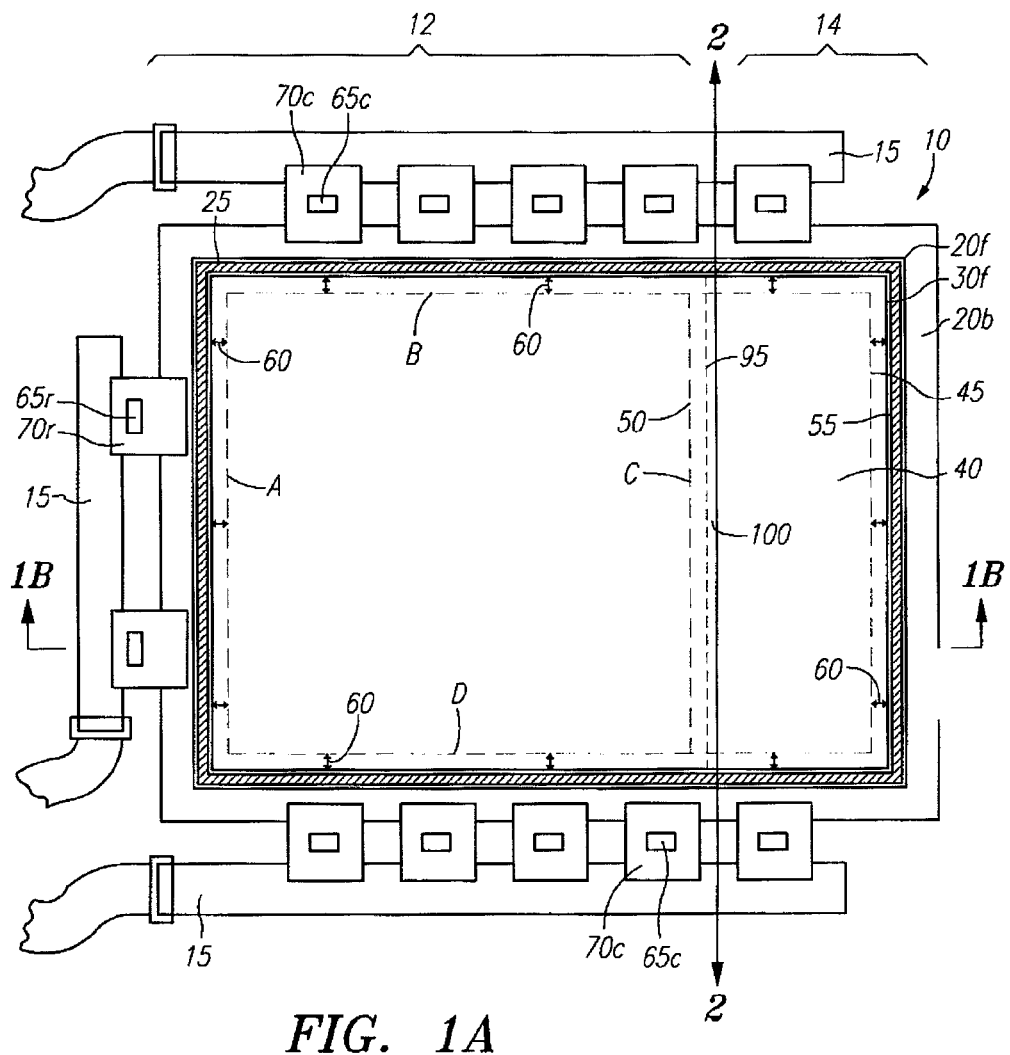
FIG. 1A is a plan view of a typical liquid crystal display ("LCD")
Figure 1B:
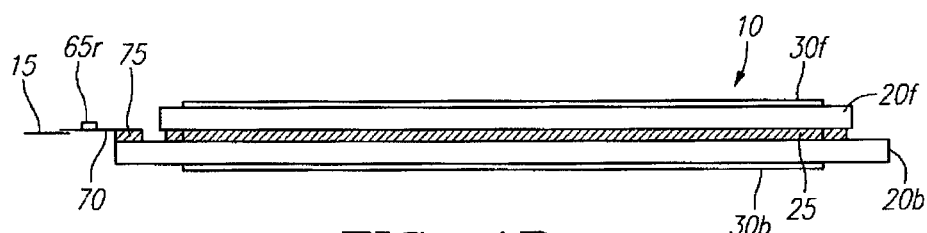
FIG. 1B is a cross-sectional view of the display of FIG. 1A, taken along line 1B-1B, with column TABs removed from the cross-section for purposes of clarity.

An electronic display may be resized by first cutting the display along desired dimensions resulting in a target display portion and a waste or excess portion using methods now known in the art. For example, turning to the drawings, FIGS. 1A and 1B show a typical non-square (rectangular) liquid crystal display ("LCD") 10, e.g., before resizing and/or other modification as described herein, but after disassembly from its original bezel, frame, and/or other associated hardware and electronics. For clarity, some of the external components associated with the display 10 (other than the circuit boards 15) are not shown, e.g., that may be bonded or otherwise attached to the plates 20. Such external components may be removed before or while customizing the display 10, as described elsewhere herein.

The display 10 generally includes a front plate 20f and a back plate 20b, e.g., made of glass, such as borosilicate or other hard glass. The plates 20 are held together by a perimeter seal 25, and may be further secured within a bezel (not shown), which, in turn, may be secured to a frame or other hardware (not shown), e.g., for attachment to the target location, e.g., in a cockpit panel of an aircraft, simulator, and the like. One or more polarizing films 30f and 30b, filters (not shown), image enhancement films (not shown), retardation films (not shown), viewing angle enhancement films (not shown), and/or other films may exist on the front and/or back outer surfaces of the plates 20.

Thus, each side of the display 10 generally includes two major layers, and possibly many minor layers. For example, the outer layer of each side may include a polarizer, e.g., made of plastic, along with several minor layers (e.g., filters, films, compensators, optical coatings, adhesives, etc.). As used herein, "polarizer" may be used generically to refer to the entire outer layer or layers on each side of the display 10, even though the outer layer may include additional layers in addition to the polarizer (or even instead of a polarizer). The inner layer of each side of the display 10 may include a major layer, i.e., the glass plate, but may also include many minor layers (e.g., electrical circuitry, dielectrics, filters, etc., not shown) printed or otherwise provided on the plate 20, e.g., on an inner surface of the glass plate 20. As used herein, "plate" may be used generically to refer to the glass plate as well as the many minor layers carried by the glass plate.

With continued reference to FIG. 1A, the original display image area 40, e.g., defined by the manufacturer of the display 10, is indicated by dashed perimeter line 45. Dashed line 50 represents the desired right edge of an exemplary target display image area 40 after resizing, as described below. A light-blocking mask (not shown), e.g., an opaque coating, may be provided on at least one of the inner surfaces of the plates 20, e.g., covering a perimeter area around the display image area 40, and extending outwardly to a sufficient distance to serve its purpose. Typically, the distance may be up to the edge of the bezel, or to the inner edge 55 of perimeter seal 25, as indicated by arrows 60 in FIG. 1A. Without the mask, light escaping from the edge of the display image area 40 may distract a person viewing the display 10 and/or otherwise impair viewing an image on the display 10.

Row and column electronic drivers 65r and 65c, respectively, are bonded to TAB substrates 70r and 70c, respectively, which in turn are bonded to the edges of the plates 20, e.g., using electrically-anisotropic adhesives known in the art. In avionics, bent TABs (not shown) may be used to save panel area. In addition or alternatively, the drivers 65 may be attached directly to the plates 20 as COGs. The TABs 70 may be bonded or soldered to circuit boards 15, and are electrically connected to external sources via connections 90 to circuit boards 15. COGs (not shown) may be electrically connected to the edges of the display plates 20, which may be electrically connected via ribbon cables to external sources (not shown). For simplicity, a few exemplary connections 90 are shown in FIG. 2A, although it will be understood that they may be provided as desired or needed.

Figure 2A:
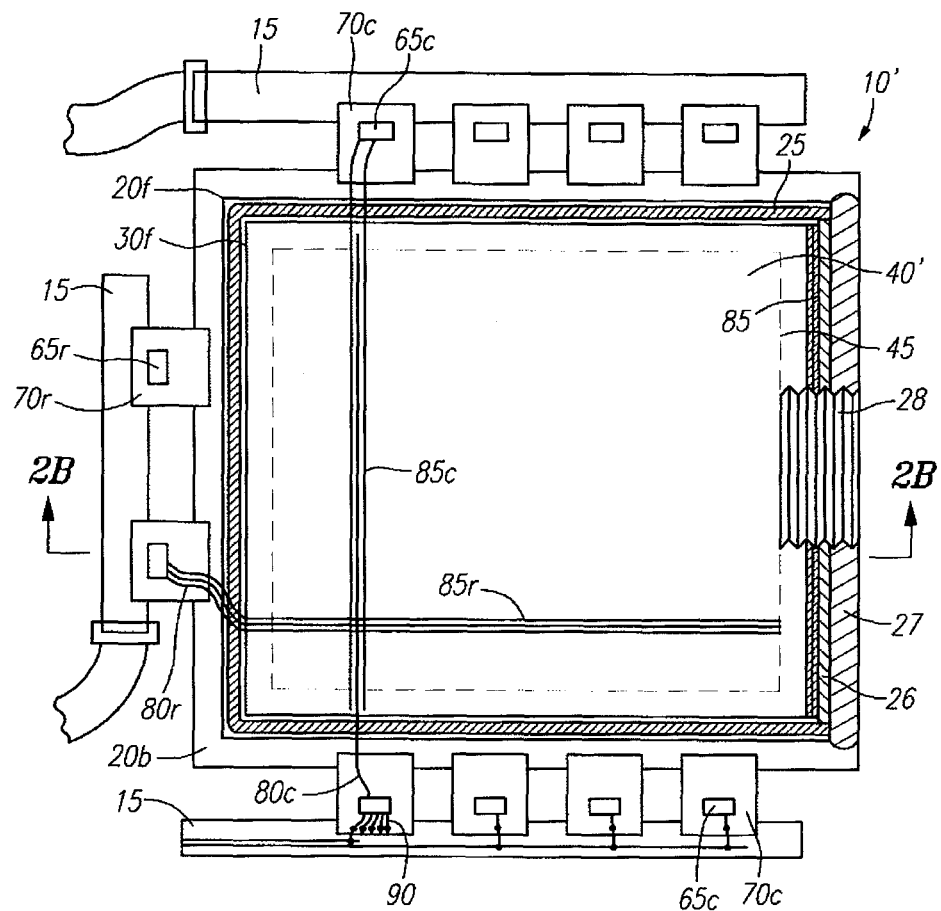
FIG. 2A is a plan view of a resized or customized display made from the display shown in FIG. 1A, by cutting along line 2-2 in FIG. 1, and then resealing a cut edge of the retained or target portion of the display.

The electronic drivers 65 may include VLSI circuits having corresponding external leads 80r and 80c that are electrically connected through perimeter seal 25 to row and column electric leads 85r and 85c, respectively (see FIG. 2A). Again for simplicity, only a few leads 80r, 80c from one row TAB 70r and two column TABs 70c are shown in FIG. 2A, but it is understood that each row TAB 70r and each column TAB 70c may have dozens or even hundreds of individual leads 80. The row and column electric leads 85 may be distributed throughout an image-generating medium, such as liquid crystal material (normally transparent) contained between the plates 20, as seen in FIG. 2A.

In addition to holding the plates 20 together, the perimeter seal 25 substantially isolates and protects the image-generating medium from the outside environment. In addition, precisely sized spacers (not shown) may be distributed throughout the image-generating medium. After conventional manufacturing, the region between the plates 20 may be maintained at a partial vacuum to draw the plates 20 against the spacers, e.g., to ensure that the distance between the plates 20 is maintained at a predetermined cell spacing or "cell gap," e.g., between about five (5) and six (6) micrometers in the exemplary case of LCDs, which is appropriate for the display 10 to operate normally. It will be appreciated that the cell gap may be orders of magnitude smaller than the thickness of the plates 20, and that the relative dimensions of the cell gap and plates are shown simply to facilitate illustration and are not to scale. Although an active matrix LCD is generally described herein, it will be appreciated that the apparatus and methods herein may be used to customize or otherwise modify other electronic displays, such as passive matrix LCDs, plasma panels, organic LEDs, (OLEDs), and the like.

Initially, to resize a display, a cut line may be identified, such as cut-line 2-2 shown in FIG. 1A, which may separate a target portion 12 of the original display 10 (e.g., corresponding to the portion to be retained to create the customized display 10') from an excess or waste portion 14 (e.g., corresponding to the portion that may be discarded or saved for other purposes). In the example shown, the target portion 12 is substantially square, e.g., corresponding to a standard shape of a region of an airplane control panel (not shown). Alternatively, the target portion 12 may have a rectangular, triangular, curved, or other more complicated shape (e.g., which may include cutting one or more additional portions from the target portion 12, as described further elsewhere herein).

If not previously disassembled, the display 10 may be removed from its frame assembly (not shown), e.g., if a fully assembled display apparatus is being resized. This may include removing any excess electronics that may interfere with a portion of the resizing procedure, and/or that may be modified or replaced with other electronics.

One or more circuit boards, e.g., circuit boards 15 and/or TABs 70, of the display may be cut, e.g., using hand or power tools, such as a hand shear, power saw, and the like. As shown in FIGS. 1A and 2A, the circuit board 15 has been cut generally parallel to cut line 2-2. Optionally, any cut edges may be trimmed or otherwise treated, e.g., using a mill, router, sandpaper, and the like. If the cut-line 2-2 requires cutting through an electronic driver 65, the driver 65 may need to be relocated and/or replaced. Alternatively, the circuit board(s) 15, TABs 70, and/or drivers 65 may be removed entirely, e.g., if new flexible or rigid circuits boards are to be attached to the customized display 10'.

One or more polarizers (and/or other films) 30 may be removed from at least a portion of the display 10, e.g., on the exposed or outer surfaces of one or both plates 20 of the display 10. For example, in one embodiment, the polarizer(s) 30 may be scored, e.g., inside the cut-line 2-2, to create a target polarizer portion overlying the target portion, which may be retained during the customization process. The remainder or excess polarizer portion (e.g., overlying the cut-line 2-2 and the excess portion 14 of the COTS display 10) may then be removed and/or discarded. In another embodiment, the polarizer(s) 30 may be scored along two lines on either side of the cut-line 2-2, and the resulting strip may be removed to provide access to the underlying plate(s) 20. Thus, the polarizer(s) 30 over the cut line 2-2 may be removed without substantial risk of damaging the surface of the plates 20, which may prevent or create problems scribing the surface of the plates 20.

In still another embodiment, a portion of the polarizer(s) 30 immediately overlying the cut-line 2-2 (or offset to either side of the cut-line 2-2, if desired) may be removed to create a narrow trench or channel 34 (not shown, see, e.g., FIG. 4A) through the polarizer(s) 30 to the outer surface of the plate(s) 20, e.g., using a saw or other tool 108, as described elsewhere herein and/or as disclosed in U.S. Pat. No. 7,938,051, the entire disclosure of which is expressly incorporated by reference herein.

Using these methods, the original polarizer(s) 30 may remain intact over a target display image area 40' while still providing unobstructed access to the plates 20, e.g., for cutting or otherwise separating portions of the plates 20. Alternatively, the display 10 may not include any polarizers or films, and this step may be omitted. For example, in FIG. 1A, the target display image area 40' of the target portion 12 is defined by a rectangle (or square) A-B-C-D, and the polarizer(s) 30 may remain intact at least over this area.

Optionally, after the one or more polarizers are at least partially removed, the outer surface of the display 10 may be cleaned along the cut line 2-2. For example, any sawdust, remaining film adhesive, and/or other residue may be removed, e.g., to clear the exposed surface of the plate 20.

Figure 3A:
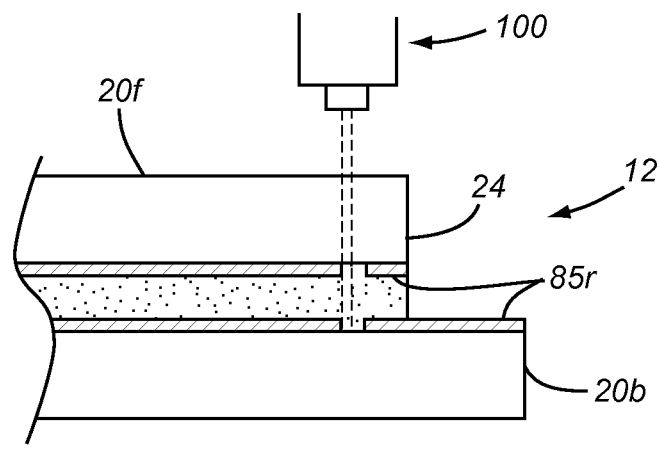
FIGS. 3A and 3B are cross-sectional and top views, respectively, showing an exemplary embodiment of a laser tool severing internal circuits on a target portion of a cut display adjacent an exposed edge.
Figure 3B:
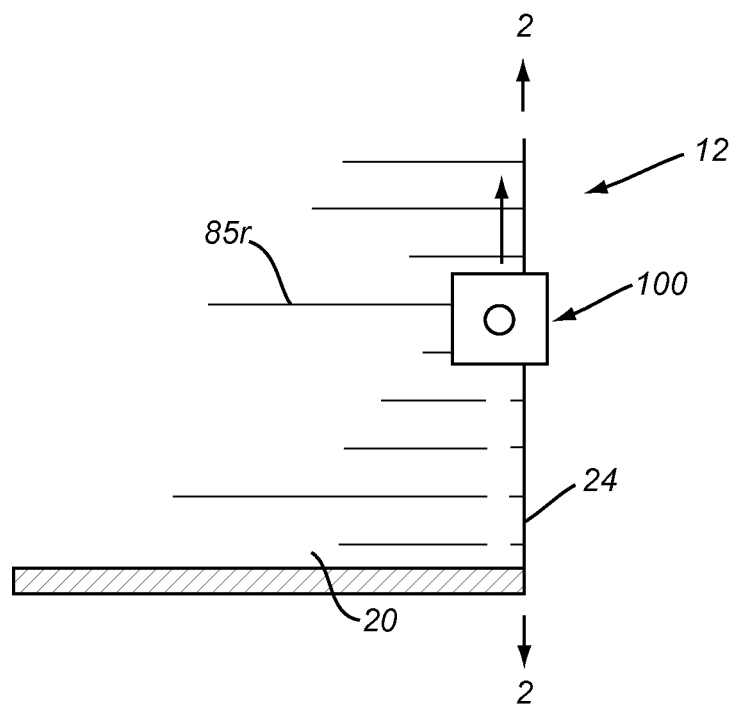
Figure 4A:
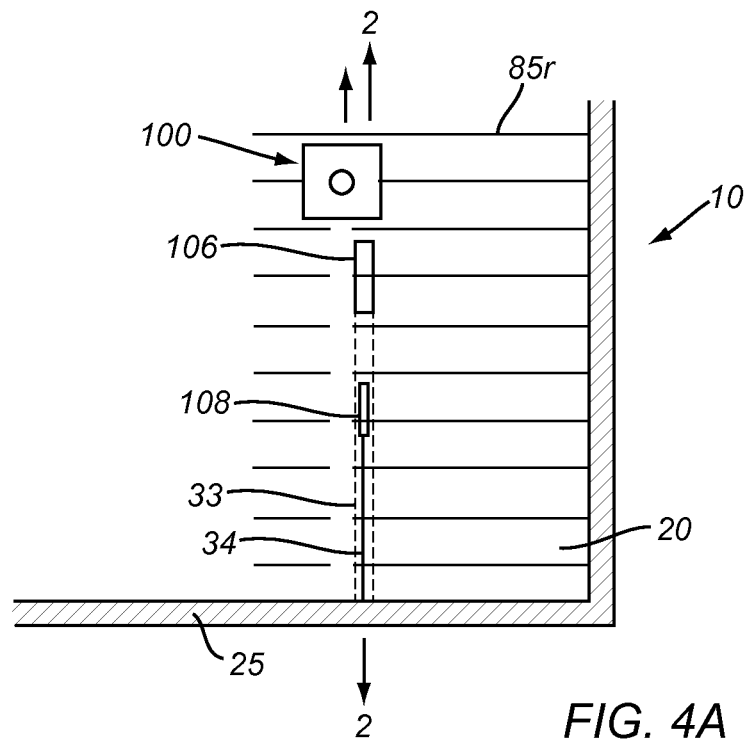
FIGS. 4A and 4B are top and side views of another exemplary embodiment of a laser tool carried on an arm of a cutting assembly severing internal circuits on an electronic display before separating the electronic display into target and waste portions.

The plates may then be cut, e.g., along the cut line 2-2, to create a cut and/or exposed edge 24, e.g., as shown in FIGS. 3A and 3B. For example, one or both plates 20 of the display 10 may be scribed along (or offset from) the intended cut line 2-2 to create a vent 34, e.g., as shown in FIG. 4A). The resulting vents 34 may not separate the target portion 12 of the display 10 from the excess portion 14. Rather, the vents 34 may form the beginning of a crack that may be propagated into the glass plates 20, as described further below. Thus, after removing the polarizer(s) and/or creating the vents 34, the display 10 may be handled or moved, if necessary (e.g., turned over to similarly process each plate 20 of the display 10), without risk of damaging the display 10 or LC material escaping from within the display 10 before separating the target and excess portions 12, 14.

Figure 4B:
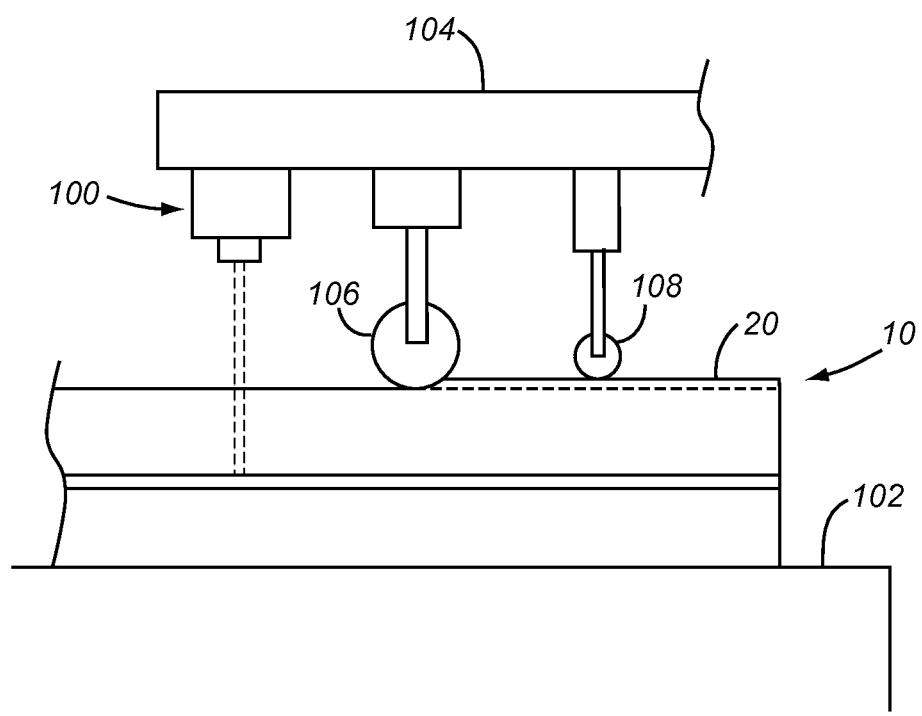

For example, the display 10 may be placed on a flat plate of glass or other fixture, such as the fixture 102 shown in FIG. 4B. A strip of material, e.g., a 0.008 inch thick silicone or rubber strip (not shown), may be placed on the flat plate before the display 10 such that the cut line 2-2 is substantially parallel to the rubber strip but offset to one side, e.g., about fifty (50) millimeters (two (2) inches). The cut line 2-2 of the upper plate may then be stroked with a cotton swab or other tool at moderate pressure, e.g., to cause the lower plate of the display 10 to break along the scribe line. The display 10 may be turned over, placed upon the flat plate over the rubber stripe and aligned in a similar manner, and the other plate (now exposed) may be stroked in a similar manner, to break the (now) lower plate along the scribe line. Thus, the display 10 may be separated into multiple pieces, e.g., into a target portion and an excess portion. Optionally, the display 10 may be cut along multiple edges, e.g., to provide a customized shape (not shown).

Further information regarding exemplary apparatus and methods for cutting displays are disclosed in U.S. Pat. Nos. 6,204,906, 7,780,492, and 7,938,051, the entire disclosures of which are expressly incorporated by reference herein. It will also be appreciated that other methods may be used for separating the target portion 12 from the excess portion 14, e.g., such as sawing partially or entirely through the plates, e.g., as disclosed in U.S. Pat. Nos. 7,002,660 and 7,161,651, the entire disclosures of which are expressly incorporated by reference herein.

Before or after separating the target portion 12 from the excess portion 14, leads and/or other internal circuits may be severed along the cut line 2-2 (shown in FIG. 1A), e.g., to prevent or reduce the risk of shorts being created along the exposed edge 24. In an exemplary embodiment, a laser may be used to direct energy through the plates 20 adjacent the cut line 2-2 such that the laser energy strikes the internal circuits, thereby heating, melting, burning, cutting, or otherwise severing the circuits.

For example, as shown in FIGS. 3A and 3B, after separating the target portion 12 from the excess portion 14 (not shown), a laser 100 may be used to cut row circuits 85r on the inner surfaces of the plates 20 of a target portion 12 adjacent the exposed edge 24. In the exemplary embodiment shown in FIG. 3B, the laser 100 may be directed substantially parallel to the exposed edge 24 from a lower end to an upper end of the target portion 12, such that all of the row circuits 85r on the target portion 12 are severed along a line offset from the exposed edge 24 (only some of the row circuits 85r are shown in FIG. 3B simply for illustration). The row circuit cut-line may be offset from the exposed edge 24 by a predetermined distance, e.g., between the right edge 50 and the cut line 2-2 shown in FIG. 1A, such that the row circuits 85r within the target image display area 40 remain active (e.g., electrically coupled to the drivers 65), while those extending through the cut line 2-2 (formerly to the excess portion 14) are electrically isolated from the drivers 65.

Alternatively, the circuits may be severed along the cut-line 2-2 before cutting a display 10 into a target portion 12 and an excess portion 14. For example, as shown in FIGS. 4A and 4B, the laser 100 may be installed on or relative to the equipment used during the cutting process, e.g., to hold and/or manipulate the display 10 and/or cutting tools to accomplish the cutting process. In the embodiment shown, the display 10 may be mounted on a vacuum chuck or other fixture 102, e.g., to stabilize and/or otherwise secure the display 10 in preparation for or during cutting.

As shown, the laser 100 may be carried on a machine tool assembly, e.g., including a movable arm 104 or other articulating tool, that may be moved relative to the fixture 102. Optionally, the movable arm 104 may carry other tools, such as a saw 106, e.g., used to create a trench 33 through any polarizer layers (not shown), a scribe wheel 108, e.g., used to scribe a vent 34 or otherwise cut the plates 20, and/or other components, similar to the tool assemblies disclosed in U.S. Pat. No. 7,938,051 incorporated by reference herein. For example, the laser 100 may be offset from the scribe wheel 108 by a predetermined distance to offset the circuit cut line from the plate cut line 2-2, as described elsewhere herein. Alternatively, the arm 104 may allow the various tools to be interchanged to accomplish the desired steps separately and/or sequentially.

The movable arm 104 may be secured on or adjacent the fixture 102, e.g., such that motion of the arm 104 relative to the fixture 102 may be controlled precisely. Alternatively, the laser 100 (and optionally the saw 106, scribe wheel 108, or other tools) may be stationary, and the fixture 102 may hold and move the display 10 under the laser 100. For example, a computer or other processor (not shown) may precisely move and/or otherwise control the arm 104 and/or fixture 102, e.g., along X and Y axes (along the plane of the fixture 102). Alternatively or in addition, the arm 104 and/or fixture 102 may be set and/or manipulated manually.

The arm 104 and/or fixture 102 may be manipulated to simultaneously or sequentially perform the steps of the cutting process. For example, in one embodiment, the various tools on the arm 104 may be used sequentially, e.g., separately activated and deactivated, first to separate circuits on the inner surface of the plate 20, then to remove polarizer layer(s) (e.g., creating a trench 33 to expose the surface of a plate 20), and then to scribe a vent 34 in the exposed surface of the plate 20. The display 10 may be turned over and the steps repeated to perform the same actions on the other plate. It will be appreciated that the laser 100 may be used before or after removing the polarizer layer(s) and/or before or after scribing the plate 20, as desired. In addition, the laser 100 may cut circuits on the inner surfaces of both plates when the first plate has its polarizer layer(s) removed and is scribed, and so the laser step may not need to be repeated when the display 10 is turned over to remove polarizer layer(s) and/or scribe the second plate.

Alternatively, one or more of these steps may be performed substantially simultaneously when the arm 104 is passed over and/or along the plate 20. For example, as best seen in FIG. 4B, the laser 20 may be positioned ahead of (or alternatively behind) the saw 106 and/or scribing wheel 108 such that the laser 100 severs the circuits at substantially the same time (e.g., in the same single or multiple passes of the arm 104) that the saw 106 creates the trench in the polarizer layer(s) and/or the scribing wheel 108 scribes the vent 34 into the plate 20.

After the desired circuits are severed, the display 10 may be cut, e.g., by breaking the plates 20 along the scribe lines, as described above, to separate the target portion 12 from the waste portion 14. The resulting exposed edge 24 may be sealed, e.g., using methods such as those disclosed in U.S. Pat. Nos. 6,204,906, 7,780,492, and in co-pending application Ser. No. 13/310,690, filed Dec. 2, 2011, and Ser. No.

13/669,379, filed Nov. 5, 2012. The entire disclosures of these references are expressly incorporated by reference herein.

Figure 2B:
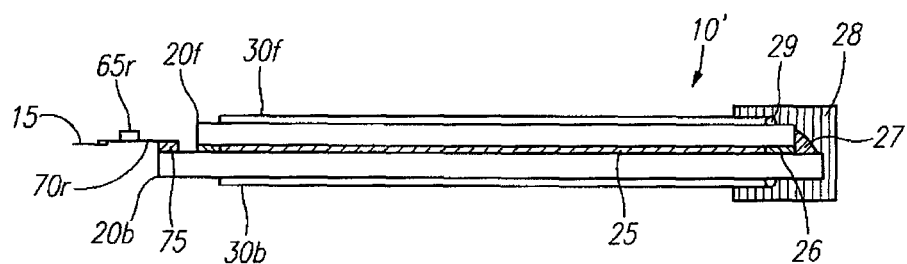
FIG. 2B is a cross-sectional view of the resized display of FIG. 2A, taken along line 2B-2B, with the column TABs removed from the cross-section for purposes of clarity.

For example, to seal the exposed edge 24, the target portion 12 may be stabilized, e.g., in a fixture (not shown) to apply sufficient pressure to restore the original distance between the plates 20 and/or prevent the plates 20 from expanding. If desired, liquid crystal (LC) may be removed from between the plates along the exposed edge, e.g., by wicking, draining, compressing the plates together to eject LC material, and the like, to create a region for sealant between the plates. As shown in FIG. 2B, adhesive or other sealant 26 may be applied along the exposed edge, e.g., such that the sealant is allowed to flow, is forced, or otherwise penetrates between the plates along the exposed edge, e.g., without significantly changing the distance between the plates (called the "cell gap"). Alternatively, sealant 26 may be injected or forced between the plates 20 along the exposed edge 24, as described in the references incorporated by reference herein. In yet another alternative, a tape seal (not shown) may be applied along the exposed edge 24.

The sealant 26 may be cured, e.g., using ultraviolet light, heat, and the like, thereby creating a barrier to prevent the image-generating medium from escaping out of the area between the plates. In addition or alternatively, one or more beads or other layers of adhesive or sealant, e.g., seals 27, 28, and/or 29 shown in FIG. 2B, may be applied externally along the cut edge 24, e.g., for environmental protection and/or edge light control. In an alternative embodiment, the laser 100 may be used to sever circuits along the cut edge 24 after applying and/or curing the sealant 26. For example, the laser 100 may be positioned to create a cut line through the circuits 85 that is offset from the cut edge 24, e.g., within the region occupied by the sealant 26 or offset between the inner most edge of the sealant 26 and the edge of the desired active area 40' of the resized display 10'.

Optionally, the resizing process described herein may be repeated along another edge of the display 10. For example, the display 10 may only include external drivers and/or other circuits along two edges (e.g., only along the top and left edges shown in FIG. 1A, and not along the bottom edge). Either or both of the right and bottom regions of the display 10 may be cut, e.g., including severing leads or other circuits, such as column and row circuits 85c, 85r that intersect the cut lines. Thus, circuits 85 extending from the drivers 65 through the desired active area 40' of the resized display 10' may remain active to produce images, while the circuits extending through or immediately adjacent the cut line(s) may be electrically isolated, thereby preventing shorts that may otherwise exist along the cut edge(s) from causing lines-out in the desired active area 40' of the resized display 10'.

Optionally, in any of the embodiments herein, to ensure that the desired circuits have been completely severed, the display may be operated to fuse open any partially cut circuits. For example, after sealing the resized display, electrical energy may be applied to the circuits, which may cause heating of any partially severed leads (due to increase resistance caused by the leads only being partially severed). Thus, this may ensure that the cut circuits are completely severed and reducing the likelihood of shorts appearing later during use of the resized display.

In an alternative embodiment, the methods herein may be used during manufacturing and/or assembly of new electronic displays. For example, a plate may have electrical circuits deposited or otherwise provided on its inner surface, and the laser may be used to sever the circuits along a cut line intended to separate a target portion of the plate from a waste portion. The plate may then be cut to separate the target portion with the severed circuits intersecting the cut line, e.g., with the circuit cut line offset from the plate cut line on the target portion. This process may be repeated for both plates of an electronic display before the plates are placed together during manufacturing, e.g., after applying a perimeter seal on one of the plates, and the like. Alternatively, the plates may be assembled (after cutting the circuits but) before the target portion is separated from the waste portion. In addition or alternatively, the circuits may be severed after the plates are assembled.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A method for resizing an electronic display, wherein the display comprises front and back plates, a perimeter seal spacing apart the plates and at least partially defining an enclosed cell area between the plates that comprises an original display image area, image-generating medium sealed in the enclosed cell area, and electrical circuits on inner surfaces of the plates extending throughout the original display image area, the method comprising:

identifying a cut line that intersects across the original display image area of the display;

directing a laser adjacent the cut line to sever the electrical circuits adjacent the cut line;

cutting the display adjacent the cut line resulting in a target display portion with an exposed edge, and an excess display portion; and sealing the exposed edge, wherein the laser is directed substantially parallel to the cut line such that the laser severs the electrical circuits along a line offset from the cut line by a predetermined distance.

2. The method of claim 1, wherein the laser severs the electrical circuits along a line between the cut line and an edge of a desired display image area of the target portion.

3. The method of claim 1, wherein the display includes external driver circuits along an edge of the display opposite the exposed edge, and wherein the electrical circuits that intersect the cut line are electrically isolated from the driver circuits when the laser severs the electrical circuits and the electrical circuits extending from the driver circuits through a desired active area of the target portion remain coupled to the driver circuits.

4. The method of claim 1, wherein cutting the display comprises breaking the perimeter seal.

5. The method of claim 1, wherein cutting the display comprises:

scribing each of the front and back plates adjacent the cut line; and breaking the front and back plates adjacent the cut line.

6. The method of claim 1, wherein the laser is directed along the exposed edge of the target display portion after separating the target display portion from the excess display portion to sever leads along the exposed edge.

7. A method for resizing an electronic display, wherein the display comprises front and back plates, a perimeter seal spacing apart the plates and at least partially defining an enclosed cell area between the plates that comprises an original display image area, image-generating medium sealed in the enclosed cell area, and electrical circuits on inner surfaces of the plates extending throughout the original display image area, the method comprising:

identifying a cut line that intersects across the original display image area of the display;

directing a laser adjacent the cut line to sever the electrical circuits adjacent the cut line;

cutting the display adjacent the cut line resulting in a target display portion with an exposed edge, and an excess display portion; and sealing the exposed edge, wherein cutting the display comprises:

scribing each of the front and back plates adjacent the cut line; and breaking the front and back plates adjacent the cut line wherein the circuits adjacent the cut line of the front plate are severed when the front plate is scribed, and wherein the circuits adjacent the cut line of the front plate are severed when the front plate is scribed.

8. The method of claim 1, wherein sealing the exposed edge comprises:

applying an adhesive or sealant along the exposed edge; and curing the adhesive or sealant to create a first seal.

9. The method of claim 8, wherein the adhesive is applied such that the adhesive is located between the plates along the exposed edge.

10. The method of claim 1, wherein the laser is directed adjacent the cut line to heat, burn, or melt leads of the electrical circuits.

11. A method for resizing an electronic display, wherein the display comprises front and back plates, a perimeter seal spacing apart the plates and at least partially defining an enclosed cell area between the plates that comprises an original display image area, image-generating medium sealed in the enclosed cell area, and electrical circuits on inner surfaces of the plates extending throughout the original display image area, the method comprising:

identifying a cut line that intersects across the original display image area of the display;

directing a laser adjacent the cut line to sever the electrical circuits adjacent the cut line;

cutting the display adjacent the cut line resulting in a target display portion with an exposed edge, and an excess display portion;

sealing the exposed edge; and operating the display to fuse open leads adjacent the cut line.

12. A method for resizing an electronic display, wherein the display comprises front and back plates, a perimeter seal spacing apart the plates and at least partially defining an enclosed cell area between the plates that comprises an original display image area, image-generating medium sealed in the enclosed cell area, and electrical circuits on inner surfaces of the plates extending throughout the original display image area, the method comprising:

identifying a cut line that intersects across the original display image area of the display;

directing a laser adjacent the cut line to sever the electrical circuits adjacent the cut line;

cutting the display adjacent the cut line resulting in a target display portion with an exposed edge, and an excess display portion; and sealing the exposed edge, wherein the laser is directed along each of the front and back plates to direct laser energy through the respective plates successively to heat, burn, or melt leads of the electrical circuits on each of the front and back plates.

13. A method for resizing an electronic display, wherein the display comprises front and back plates, a perimeter seal spacing apart the plates and at least partially defining an enclosed cell area between the plates that comprises an original display image area, image-generating medium sealed in the enclosed cell area, and electrical circuits on inner surfaces of the plates extending throughout the original display image area, the method comprising:

identifying a cut line that intersects across the original display image area of the display;

directing a laser adjacent the cut line to sever the electrical circuits adjacent the cut line;

cutting the display adjacent the cut line resulting in a target display portion with an exposed edge, and an excess display portion; and sealing the exposed edge, wherein the laser is directed adjacent the cut line to sever the circuits after cutting the display.

14. The method of claim 13, wherein the display includes external driver circuits along an edge of the display opposite the exposed edge, and wherein the electrical circuits that intersect the cut line are electrically isolated from the driver circuits when the laser severs the electrical circuits and the electrical circuits extending from the driver circuits through a desired active area of the target portion remain coupled to the driver circuits.

15. The method of claim 13, wherein cutting the display comprises breaking the perimeter seal.

16. The method of claim 13, wherein the laser is directed adjacent the cut line to heat, burn, or melt leads of the electrical circuits.

17. A method for resizing an electronic display, wherein the display comprises front and back plates, a perimeter seal spacing apart the plates and at least partially defining an enclosed cell area between the plates that comprises an original display image area, image-generating medium sealed in the enclosed cell area, and electrical circuits on inner surfaces of the plates extending throughout the original display image area, the method comprising:

identifying a cut line that intersects across the original display image area of the display;

directing a laser adjacent the cut line to sever the electrical circuits adjacent the cut line;

cutting the display adjacent the cut line resulting in a target display portion with an exposed edge, and an excess display portion; and sealing the exposed edge, wherein the laser is directed adjacent the cut line to sever the circuits before cutting the display.

18. The method of claim 17, wherein the display includes external driver circuits along an edge of the display opposite the exposed edge, and wherein the electrical circuits that intersect the cut line are electrically isolated from the driver circuits when the laser severs the electrical circuits and the electrical circuits extending from the driver circuits through a desired active area of the target portion remain coupled to the driver circuits.

19. The method of claim 17, wherein cutting the display comprises breaking the perimeter seal.

20. The method of claim 17, wherein the laser is directed adjacent the cut line to heat, burn, or melt leads of the electrical circuits.

* * * * *